(12) United States Patent
Ba et al.

(10) Patent No.: US 11,914,441 B2
(45) Date of Patent: Feb. 27, 2024

(54) SYSTEMS AND METHODS FOR POWER OUTAGE PROTECTION OF STORAGE DEVICE

(71) Applicant: ZHEJIANG DAHUA TECHNOLOGY CO., LTD., Zhejiang (CN)

(72) Inventors: Jing Ba, Hangzhou (CN); Guobao Feng, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 119 days.

(21) Appl. No.: 17/658,090

(22) Filed: Apr. 5, 2022

(65) Prior Publication Data

US 2022/0229482 A1 Jul. 21, 2022

Related U.S. Application Data

(63) Continuation of application No. PCT/CN2020/106986, filed on Aug. 5, 2020.

(30) Foreign Application Priority Data

Oct. 10, 2019 (CN) .......................... 201910959321.7

(51) Int. Cl.
G06F 1/00 (2006.01)
G06F 1/30 (2006.01)
G06F 3/06 (2006.01)

(52) U.S. Cl.
CPC .............. *G06F 1/30* (2013.01); *G06F 3/0625* (2013.01); *G06F 3/0653* (2013.01); *G06F 3/0683* (2013.01)

(58) Field of Classification Search
CPC ........ G06F 1/30; G06F 3/0625; G06F 3/0653; G06F 3/0683; G06F 1/3221;
(Continued)

(56) References Cited

U.S. PATENT DOCUMENTS

| 5,301,161 A | 4/1994 | Landgraf et al. |
| 6,038,190 A | 3/2000 | Kowalski et al. |

(Continued)

FOREIGN PATENT DOCUMENTS

| CN | 1124848 A | 6/1996 |
| CN | 101364138 | 2/2009 |

(Continued)

OTHER PUBLICATIONS

The Extended European Search Report in European Application No. 20873798.1 dated Feb. 14, 2023, 21 pages.

(Continued)

*Primary Examiner* — Xuxing Chen
(74) *Attorney, Agent, or Firm* — METIS IP LLC

(57) ABSTRACT

The present disclosure relates to systems and methods for power outage protection. The system may obtain a read/write signal of each of a plurality of storage devices. For each of the plurality of storage devices, the system may identify a state of the storage device based on the read/write signal of the storage device. The state of the storage device may include a read/write state or an idle state of the storage device. In response to an interruption of power supply to the plurality of storage devices, the system may selectively provide electric power to the plurality of storage devices using a power source based at least partially on the states of the plurality of storage devices.

20 Claims, 11 Drawing Sheets

(58) Field of Classification Search
CPC .... G06F 1/3268; G06F 3/0617; G06F 3/0634; G06F 3/0619; G06F 3/0629; Y02D 10/00
See application file for complete search history.

(56) References Cited

U.S. PATENT DOCUMENTS

| | | | |
|---|---|---|---|
| 6,259,371 | B1 | 7/2001 | Chang |
| 7,107,480 | B1* | 9/2006 | Moshayedi ......... G06F 11/1441 714/E11.138 |
| 8,751,836 | B1 | 6/2014 | Piszczek et al. |
| 10,235,229 | B1* | 3/2019 | Bernat ................ G06F 11/0793 |
| 2001/0047492 | A1 | 11/2001 | Tsui et al. |
| 2002/0101772 | A1* | 8/2002 | Denda ................... G11B 19/04 |
| 2003/0105932 | A1 | 6/2003 | David et al. |
| 2004/0105324 | A1 | 6/2004 | Sakurai et al. |
| 2006/0056321 | A1 | 3/2006 | Kakihara |
| 2009/0240881 | A1 | 9/2009 | Halloush et al. |
| 2011/0058440 | A1 | 3/2011 | Smith et al. |
| 2012/0117409 | A1* | 5/2012 | Lee ........................ G11C 5/147 713/340 |
| 2012/0226881 | A1 | 9/2012 | Yi |
| 2012/0265928 | A1 | 10/2012 | Mun et al. |
| 2014/0089765 | A1 | 3/2014 | Xing et al. |
| 2015/0106644 | A1 | 4/2015 | Lin et al. |
| 2016/0098328 | A1 | 4/2016 | Lucas et al. |
| 2017/0060668 | A1 | 3/2017 | Farhan et al. |
| 2017/0220505 | A1 | 8/2017 | Breakstone et al. |
| 2017/0315889 | A1 | 11/2017 | Delaney et al. |
| 2018/0267827 | A1 | 9/2018 | Kanno |
| 2018/0329469 | A1* | 11/2018 | Hua ......................... G06F 1/30 |
| 2019/0332530 | A1* | 10/2019 | Ji ........................... G11C 16/30 |
| 2020/0035299 | A1* | 1/2020 | Lien ................... G11C 13/0069 |

FOREIGN PATENT DOCUMENTS

| | | |
|---|---|---|
| CN | 101826060 | 9/2010 |
| CN | 103645981 | 3/2014 |
| CN | 104881375 | 9/2015 |
| CN | 106155947 A | 11/2016 |
| CN | 109358742 | 2/2019 |
| CN | 110806794 | 2/2020 |
| WO | 2011019216 A2 | 2/2011 |
| WO | 2018215978 A1 | 11/2018 |

OTHER PUBLICATIONS

International Search Report in PCT/CN2020/106986 dated Oct. 28, 2020, 6 pages.
Written Opinion in PCT/CN2020/106986 dated Oct. 28, 2020, 5 pages.
The Second Office Action in Chinese Application No. 201910959321.7 dated Oct. 19, 2021, 11 pages.
SFF-8485 Specification for Serial Gpio (SGPIO) Bus, SFF Committee, Revision 0.7, 2006, 40 pages.
Serial ATA Revision 3.0, Serial ATA International Organization, Gold Revision, 2009, 663 pages.
Partial Supplementary European Search Report in European Application No. 20873798.1 dated Oct. 10, 2022, 19 pages.

* cited by examiner

SYSTEMS AND METHODS FOR POWER OUTAGE PROTECTION OF STORAGE DEVICE

CROSS-REFERENCE TO RELATED APPLICATIONS

This application is a continuation of International Application No. PCT/CN2020/106986, filed on 5 Aug. 2020, which claims priority to Chinese Patent Application No. 201910959321.7 filed on Oct. 10, 2019, the contents of which are incorporated herein by reference.

TECHNICAL FIELD

The present disclosure generally relates to power outage protection, and in particular, to systems and methods for power outage protection of a storage device.

BACKGROUND

A storage system usually includes a plurality of storage devices. The working states of different storage devices may vary according to the actual requirements. For example, during a specific time period, data stored in some of the storage devices may remain unchanged, while other storage devices may keep reading or writing data into the disk(s). When an interruption of power supply occurs, a standby power source may be used to provide electric power for the plurality of storage devices. Conventionally, a capacitor or battery may be used as the standby power source. However, the capacitor or battery cannot provide enough electric power to all of the plurality of storage devices. Alternatively, an uninterruptible power supply (UPS) may be used to provide electric power for the plurality of storage devices, but it is high demanding for selecting a proper UPS that meets the power requirements of all of the plurality of storage devices. Therefore, it is desirable to provide a system and method for efficiently providing electric power for the plurality of storage devices, thereby avoiding the data lost and efficiently ensuring the safety of the data.

SUMMARY

According to an aspect of the present disclosure, a system for power outage protection is provided. The system may include at least one processor configured to direct the system to perform the following operations. The system may obtain a read/write signal of each of a plurality of storage devices. For each of the plurality of storage devices, the system may identify a state of the storage device based on the read/write signal of the storage device. The state of the storage device may include a read/write state or an idle state of the storage device. The system may selectively provide electric power to the plurality of storage devices using a power source based at least partially on the states of the plurality of storage devices in response to an interruption of power supply to the plurality of storage devices.

In some embodiments, each of the plurality of storage devices may include at least one of a controller, an interface, or a memory.

In some embodiments, the read/write signal of each of the plurality of storage devices may include at least one of a read/write signal from the controller, the interface, or the memory of the storage device.

In some embodiments, the identifying the state of each of the plurality of storage devices based on the read/write signal of the storage device may include determining that the storage device is in the read/write state on occurrence of a rising edge or a falling edge of the read/write signal.

In some embodiments, to detect the interruption of power supply to the plurality of storage devices, the system may detect a change of a voltage of the plurality of storage devices. The system may determine that the interruption of power supply occurs in response to a determination that the change of the voltage of the plurality of storage devices is greater than a voltage threshold.

In some embodiments, to selectively provide electric power to the plurality of storage devices using the power source, the system may determine whether a storage device is in the read/write state for each of the plurality of storage devices. The system may provide electric power to the storage device using the power source in response to a determination that the storage device is in the read/write state.

In some embodiments, the system may perform a power-off or hibernation operation on the storage device in response to determining that the storage device is not in the read/write state.

In some embodiments, to selectively provide electric power to the plurality of storage devices using the power source, the system may determine a read/write count of each of the plurality of storage devices within a period. The system may determine a read/write frequency of each of the plurality of storage devices based on the read/write count of each of the plurality of storage devices. The system may provide electric power to the storage device in response to a determination that the read/write frequency of one storage device is greater than a frequency threshold.

In some embodiments, to determine the read/write frequency of each of the plurality of storage devices based on the read/write count of each of the plurality of storage devices, the system may determine a count of occurrence of a rising edge or a falling edge of the read/write signal of the storage device within the period for each of the plurality of storage devices based on the read/write signal of the storage device. The system may determine the read/write frequency of the storage device based on the count of the occurrence of the rising edge or the falling edge of the read/write signal and the period.

In some embodiments, the system may further determine whether electric quantity of the electric power is greater than an electric quantity threshold. The system may provide electric power to the storage device the read/write frequency of which is greater than the frequency threshold in response to determining that the electric quantity of the electric power is greater than the electric quantity threshold.

In some embodiments, the system may perform a power-off or hibernation operation on the storage device in response to determining that the read/write frequency of the storage device is not greater than the frequency threshold.

In some embodiments, the power source may include at least one of a battery, a capacitor, or an UPS.

According to another aspect of the present disclosure, a method for power outage protection is provided. The method may include obtaining a read/write signal of each of a plurality of storage devices. For each of the plurality of storage devices, the method may include identifying a state of the storage device based on the read/write signal of the storage device. The state of the storage device may include a read/write state or an idle state of the storage device. In response to an interruption of power supply to the plurality of storage devices, the method may include selectively providing electric power to the plurality of storage devices using a power source based at least partially on the states of the plurality of storage devices.

In some embodiments, the method may include performing a power-off or hibernation operation on the storage device in response to determining that the storage device is not in the read/write state.

In some embodiments, to detect the interruption of power supply to the plurality of storage devices, the method may include detecting a change of a voltage of the plurality of storage devices. The method may include determining that the interruption of power supply occurs in response to a determination that the change of the voltage of the plurality of storage devices is greater than a voltage threshold.

In some embodiments, the method may further include determining whether electric quantity of the electric power is greater than an electric quantity threshold. The method may include providing electric power to the storage device the read/write frequency of which is greater than the frequency threshold in response to determining that the electric quantity of the electric power is greater than the electric quantity threshold.

In some embodiments, the method may include performing a power-off or hibernation operation on the storage device in response to determining that the read/write frequency of the storage device is not greater than the frequency threshold.

According to yet another example, a non-transitory computer readable medium is provided. The non-transitory computer readable medium may include a set of instructions for power outage protection, wherein when executed by at least one processor, the set of instructions may direct the at least one processor to perform a method. The method may include obtaining a read/write signal of each of a plurality of storage devices. For each of the plurality of storage devices, the method may include identifying a state of the storage device based on the read/write signal of the storage device. The state of the storage device may include a read/write state or an idle state of the storage device. In response to an interruption of power supply to the plurality of storage devices, the method may include selectively providing electric power to the plurality of storage devices using a power source based at least partially on the states of the plurality of storage devices.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
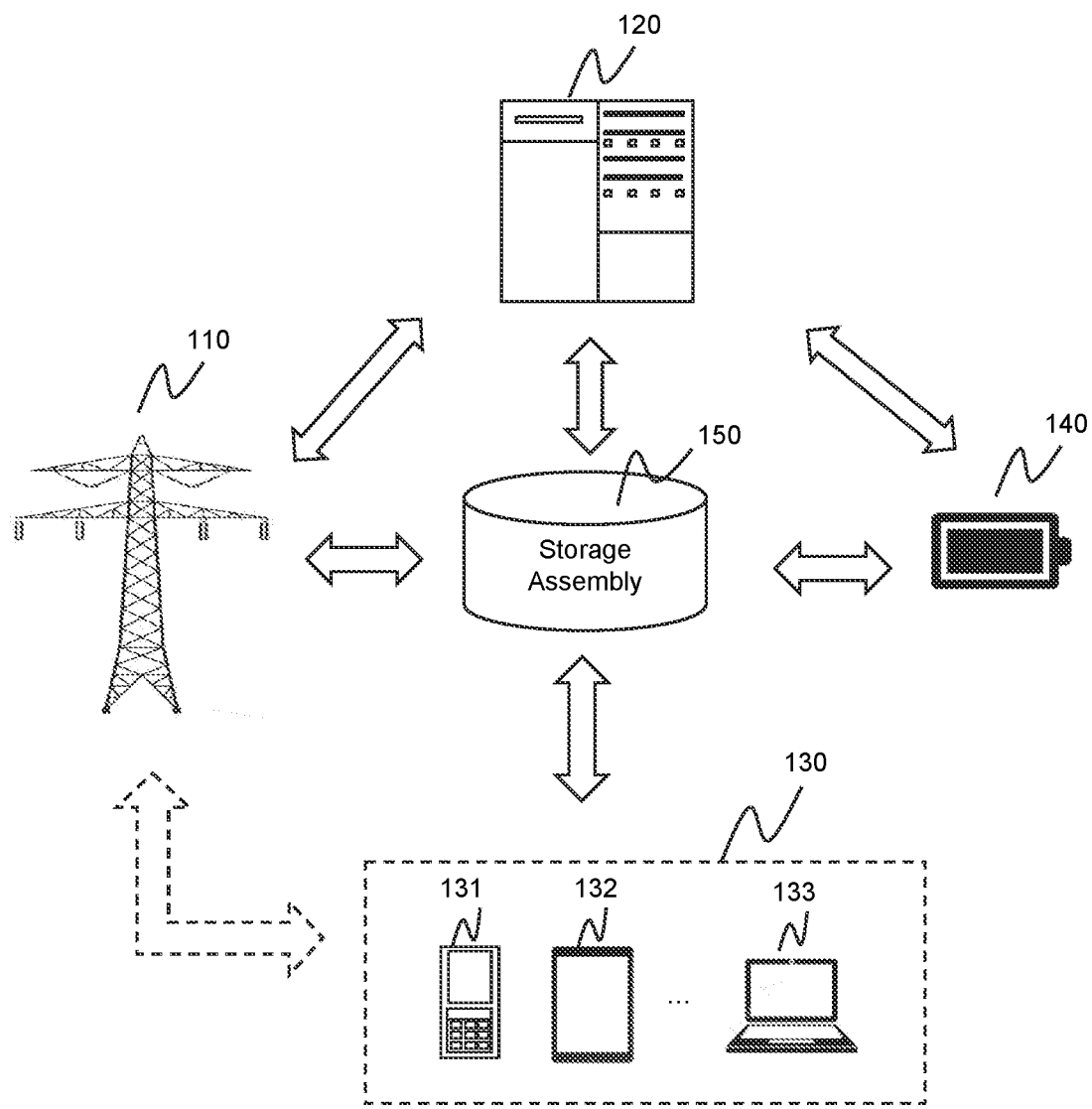
FIG. 1 is a schematic diagram illustrating an exemplary power outage protection system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to methods and systems for power outage protection. The systems may obtain a read/write signal of each of a plurality of storage devices. The systems may identify a state of each of the plurality of storage devices based on the read/write signal of the storage device. The state of the storage device may include a read/write state and an idle state. In response to an interruption of power supply to the plurality of storage devices, the systems may selectively provide electric power to the plurality of storage devices using a power source. In some embodiments, the systems may use the power source to mainly provide its electric power to one or more storage devices which are in the read/write state to ensure safety of the data being read or written, thus saving the electric power of the power source. Alternatively or additionally, the systems may also use the power source to provide electric power to one or more storage devices satisfying a certain condition (e.g., whether it is a high read/write frequency, whether it is specially marked). In addition, the systems may perform a power-off or hibernation operation on the remaining storage device(s). In this way, it may greatly save the power of the power source, thereby improving the use time and service life of the power source.

FIG. 1 is a schematic diagram illustrating an exemplary power outage protection system 100 according to some embodiments of the present disclosure.

In some embodiments, the power outage protection system 100 may be used in any field that may have a plurality of storage devices. For example, the power outage protection system 100 may be used in a data backup field (e.g., data backup of a user, data backup of an enterprise, etc.), a media (e.g., a TV station, a radio station, an Internet content provider, etc.) field, a surveillance (e.g., a digital surveillance (DVR), a network surveillance (NVR)) field, a financial field, a power field, a medical field, a navigation field, a scientific laboratory field, a data center, a telecommunication field, or the like, or any combination thereof. As illustrated in FIG. 1, the power outage protection system 100 may include a power supply device 110, a processing device 120, a terminal 130, a power source 140, and a storage assembly 150.

The power supply device 110 may be configured to provide electric power for component(s) of the power outage protection system 100. For example, the power supply device 110 may provide electric power for the processing device 120 to process data and/or information of the power outage protection system 100. As another example, the power supply device 110 may provide electric power for the storage assembly 150 to read and/or write data and/or information. As a further example, the power supply device 110 may provide electric power for the power source 140 to store electric power. In some embodiments, the power supply device 110 may include an electric power storage device, an electric power generation device, or the like, or any combination thereof. The electric power storage device may include one or more batteries. The electric power generation device may include one or more electric generators. Exemplary electric generators may be implemented as one or more energy conversion devices like a photovoltaic power generation device, a heat conduction power generation device, a wind power generation device, a nuclear power generation device, etc.

In some embodiments, the processing device 120 may be configured to instruct operation states of components (e.g., the power supply device 110, the power source 140, the terminal 130, or the storage assembly 150) of the power outage protection system 100 when an interruption of power supply occurs. For example, the processing device 120 may instruct a storage device of the storage assembly 150 to change an operation from a power-on mode to a power-off mode when the interruption of power supply occurs.

In some embodiments, the processing device 120 may be configured to process data and/or signal of component(s) of the power outage protection system 100. For example, the processing device 120 may process a signal associated with electric power of the power supply device 110 to obtain information (e.g., a parameter) of the electric power of the power supply device 110. As another example, the processing device 120 may process a read/write signal of a storage device of the storage assembly 150 to determine a state of the storage device. As a further example, the processing device 120 may process data associated with the power source 140 to determine electric quantity of the power source 140. In some embodiments, the processing device 120 may generate a control instruction including, for example, a control instruction to control the power supply device 110 to provide electric power for other components of the power outage protection system 100, a control instruction to perform a power-off or hibernation operation on storage device(s) of the storage assembly 150, a control instruction to transmit data among components of the power outage protection system 100, or the like, or any combination thereof. In some embodiments, the control instruction may be generated based on data and/or signal received from the power supply device 110, the terminal 130, the power source 140, or a user (e.g., a user of the terminal 130).

In some embodiments, the processing device 120 may include one or more processors to perform processing operations disclosed in this disclosure. The processor(s) may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof. For example, the processing device 120 may include a microprocessor to process a read/write signal from the storage assembly 150. As another example, the processing device 120 may include a circuit to process the electric power of the power supply device 110.

The terminal 130 may be configured to receive information from and/or send instruction to the processing device 120, the terminal 130, or the storage assembly 150. For example, the terminal 130 may receive a user instruction from its I/O interface and send the user instruction to the processing device 120 to initiate one or more operations. Specifically, the user instruction may indicate an operation to retrieve and/or write data to the storage assembly 150. In some embodiments, the terminal 130 may include any device which may generate data and/or signal, and the data and/or signal may be stored into the storage assembly 150. The terminal 130 may include, but is not limited to a smart phone, a personal computer, a tablet, a laptop, a wearable device (e.g., a smart watch, a pair of smart glasses, or the like), or the like, or a combination thereof.

The power source 140 may be configured to provide electric power for other components of the power outage protection system 100. For example, the power source 140 may provide electric power for the storage assembly 150 to maintain operation (e.g., a read/write operation) of the storage assembly 150 when a power outage occurs (e.g., when the power provided by the power supply device 110 is interrupted). As another example, the power source 140 may provide electric power for the processing device 120 to process data and/or signal. In some embodiments, the power source 140 may be of any type including a battery, a generator, a flywheel energy storage, a fuel cell, a capacitor, an uninterruptible power supply (UPS), or the like, or any combination thereof. The battery may include, but is not limited to a dry battery, a lithium battery, a Daniel battery, a fuel battery, or the like. The capacitor may include, but is not limited to a paper capacitor, a plastic capacitor, a glass capacitor, a mica capacitor, a ceramic capacitor, an electrolytic capacitor, a polymer capacitor, a feedthrough capacitor, a supercapacitor, or the like, or any combination thereof. A UPS may refer to an electrical device that provides electric power to a storage device when an interruption of power supply for the storage device occurs. In some embodiments, the UPS may be used to stabilize power supply (e.g., a voltage of the power supply) to the storage device, which may avoid problems of the storage device caused by an unstable power supply. In some embodiments, the power source 140 may be charged by an external power source, or a power generation device. In some embodiments, the power source 140 and the power supply device 110 may be of a same type. For example, the power source 140 and the power supply device 110 may be an electric generator. In some embodiments, the power source 140 and the power supply device 110 may be of different types. For example, the power source 140 may be an UPS, while the power supply device 110 may be an electric generator.

The storage assembly 150 may be configured to store data and/or signal from the power supply device 110, the processing device 120, the terminal 130, or the power source 140. The storage assembly 150 may include a plurality of storage devices, which may be configured to store the data and/or signal together or independently. In some embodiments, each storage device may be independently controlled by the processing device 120 to enter into different operation modes. Exemplary operation modes may include a power-on mode, a power-off mode, or a hibernation mode, or the like. Different operation modes may correspond to different levels of power consumption. For example, a storage device in the power-on mode may consume more power than it is in the hibernation mode or in the power-off mode. In some embodiments, when a power outage occurs, the processing device 120 may instruct one or more storage devices to alter their power consumption from a higher level to a lower level, e.g., from the power-on mode to the power-off mode. Exemplary storage devices may include a mass storage, a removable storage, a volatile read-and-write memory, a read-only memory (ROM), or the like, or any combination thereof. For example, the mass storage may include a magnetic disk, an optical disk, a hard disk, drive, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc.

Alternatively, the storage assembly 150 may be configured to store one or more programs and/or instructions that may be executed by the processor(s) of the image processing system 100 to perform exemplary methods described in this disclosure. For example, the storage assembly 150 may be configured to store program(s) and/or instruction(s) executed by the processor(s) of the power outage protection system 100 to obtain the signal of the storage assembly 150, identify a state of one or more storage devices, and provide electric power to a portion or all of the storage devices.

In some embodiments, the storage assembly 150 (or each storage device thereof) may include a controller, an interface, or at least one memory. The controller may be configured to control data read/write of the storage assembly 150. For example, the controller may allocate load of data on each of the at least one memory. The controller may be further configured to connect the memory and the interface of the storage assembly 150. The memory may be configured to store data and/or information that is written into the storage assembly 150. In some embodiments, the memory may include a flash drive (e.g., a single layer cell (SLC), a multi-level cell (MLC), a Trinary-Level Cell (TLC), a quadruple level cell (QLC), a three dimensional NOT-AND (3D NAND), a DRAM, or the like, or any combination thereof. The interface may be configured to connect the storage assembly 150 and an external device (e.g., the terminal 130) to perform data communication between the storage assembly 150 and the external device. The interface may include an ATA/IDE interface, an SATA interface, an SCSI interface, an SAS interface, a PCI-E interface, an mSATA interface, an M.2 interface, a USB interface, a fiber channel (FC) interface, an IEEE 1394 interface, a general purpose input/output (SGPIO), a general purpose input/output (GPIO), or the like, or any combination thereof.

In some embodiments, two or more components of the power supply device 110, the processing device 120, the terminal 130, power source 140, and the storage assembly 150 may be integrated with each other. For example, the processing device 120 and the storage assembly 150 may be integrated into one device. As another example, the storage assembly 150 and the terminal 130 may be integrated into a one device. As a further example, the terminal 130 and the processing device 120 may be integrated in one device to perform exemplary functions of the terminal 130 and the processing device 120 disclosed in this disclosure.

In some embodiments, one or more of the above components may be located remote from each other. Merely by way of example, the processing device 120 may be implemented on a cloud platform (e.g., a cloud computing platform or cloud storing platform). As another example, the terminal 130 may be controlled by a remote system (e.g., a remote monitoring system or a remote security system).

It should be understood that, the component(s) of the power outage protection system 100 illustrated in FIG. 1 may be implemented via various ways. For example, the components may be implemented through hardware, software, or a combination thereof. Herein, the hardware may be implemented by a dedicated logic, the software may be stored in the storage and executed by proper instructions, for example, by a microprocessor or a dedicated design hardware. Those skilled in the art can understand that, the methods and systems described in this disclosure may be implemented by the executable instructions of a computer and/or by control code in the processor, for example, the code supplied in a carrier medium such as a disk, a CD, a DVD-ROM, in a programmable storage such as a read-only memory, or in a data carrier such as optical signal carrier or electric signal carrier. The systems and the methods in the present application may be implemented by a hardware circuit in a programmable hardware device in a ultra large scale integrated circuit, a gate array chip, a semiconductor such as a transistor, a field programmable gate array, a programmable logic device, a software performed by various processors, or a combination thereof (e.g., firmware).

Figure 2:
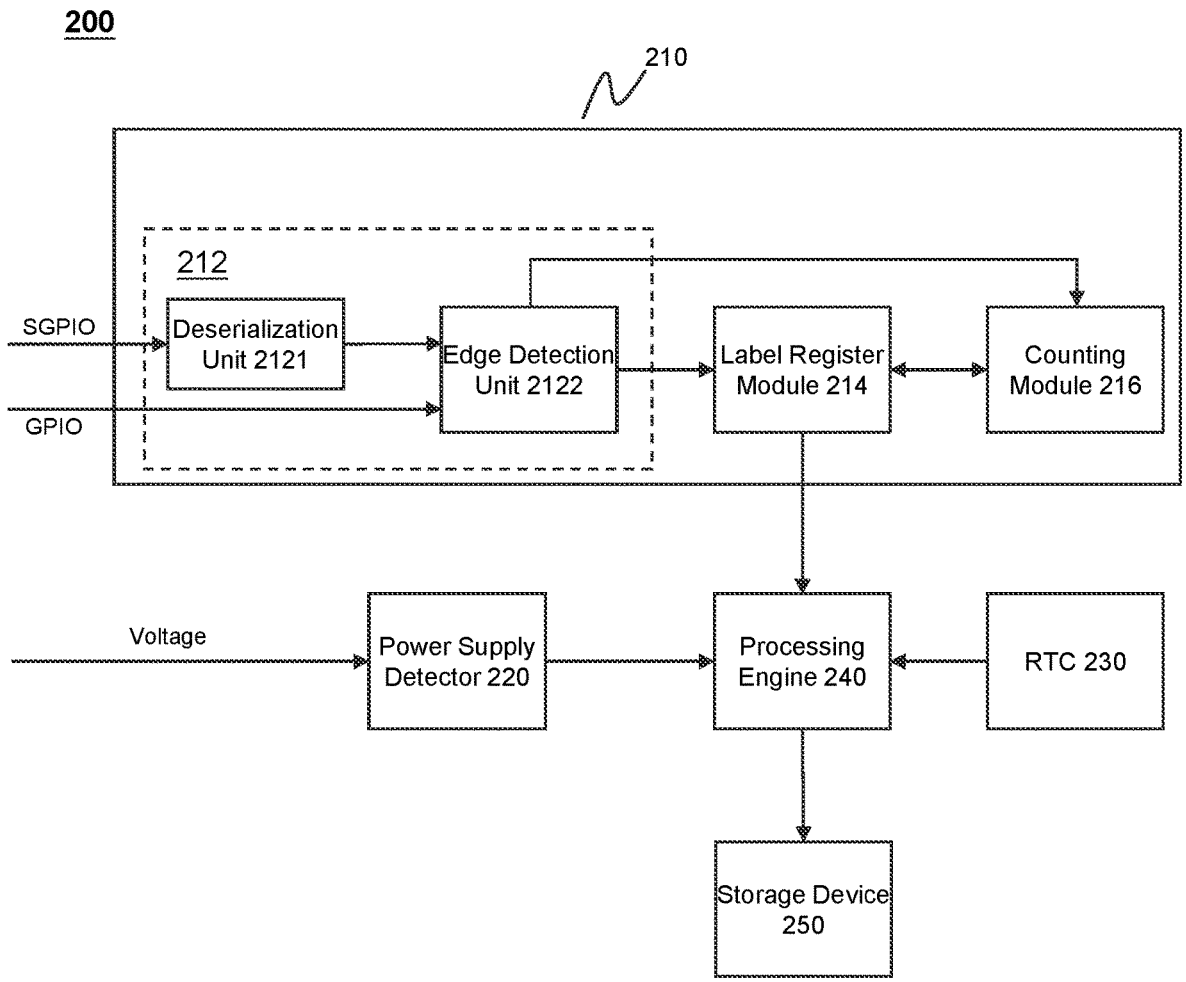
FIG. 2 is a schematic diagram illustrating an exemplary hardware and/or software components of an exemplary computing device according to some embodiments of the present disclosure.

FIG. 2 is a schematic diagram illustrating an exemplary hardware and/or software components of an exemplary computing device 200 according to some embodiments of the present disclosure. The computing device 200 may be configured to implement a device/component/module/unit of the power outage protection system 100. For example, the computing device 200 may be part of or perform at least some similar functions as the processing device 120. The computing device 200 may include a read/write signal detector 210, a power supply detector 220, a real-time clock (RTC) 230, a processing engine 240, and a storage device 250.

In some embodiments, the computing device 200 may receive a read/write signal from the storage device 250, process the read/write signal, and determine a state of the storage device 250. In some embodiments, a signal with a periodic high voltage and low voltage may indicate that the storage device is in a read/write state, a signal with a constant high or low voltage may indicate that the storage device is in an idle state. The signal of the storage device 250 may be transmitted to the read/write signal detector 210 via an interface. The interface may include an ATA/IDE interface, an SATA interface, an SCSI interface, an SAS interface, a PCI-E interface, an mSATA interface, an M.2 interface, a USB interface, a fiber channel (FC) interface, an IEEE 1394 interface, an SGPIO, a GPIO, or the like, or any combination thereof. The read/write signal detector 210 may be configured to process the read/write signal of the storage device 250. For example, the read/write signal detector 210 may receive the signal and output a label of the storage device 250. In some embodiments, the read/write signal detector 210 may receive the signal from a controller, an extended chip, an interface, a memory, or the other components of the storage device 250. In some embodiments, the read/write signal detector 210 may be of any types including, but is not limited to a complex programmable logic (CPLP) device, a programmable logic array (PLA) device, a field-programmable gate array (FPGA) device, a generic array logic (GAL) device, or the like, or any combination thereof. As shown in FIG. 2, The read/write signal detector 210 may include a state detection module 212, a label register module 214, and a counting module 216. The state detection module 212 may be configured to preprocess the obtained signal, detect the read/write signal of the storage device 250 and output an indicator indicating a state of the storage device 250. In some embodiments, the state detection module 212 may include a deserialization unit 2121, and an edge detection unit 2122. The deserialization unit 2121 may be configured to deserialize the received signal (e.g., a signal obtained from the SGPIO). The deserialization of the signal may include a determination of a signal structure from a series of bytes. The edge detection unit 2122 may be connected to the interface of the storage device 250 or the deserialization unit 2121 to determine the indicator of the storage device 250. For example, the edge detection unit 2122 may output a first certain voltage indicator when it detects a rising edge (or a falling edge) of the read/write signal. As another example, the edge detection unit 2122 may output a second certain voltage indicator when it detects a constant line of the read/write signal. The edge detection unit 2122 may send the detection result to the label register module 214. The label register module 214 may be configured to receive the detection result of the edge detection unit 2122 and determine a label of the storage device 250. For example, when the label register module 214 receives the first certain voltage indicator from the edge detection unit 2122, the label register module 214 may determine the label of the storage device as "Flag=1". As another example, when the label register module 214 receive the second certain voltage indicator from the edge detection unit 2122, the label register module 214 may determine the label of the storage device as "Flag=0". The label of the "Flag=1" indicates that the storage device 250 is in the read/write state. The label of the "Flag=0" indicates that the storage device 250 is in the idle state. In some embodiments, the read/write signal detector 210 may transmit the label of the storage device 250 to the counting module 216 and/or the processing engine 240 for further process via a wireless or wired manner.

The counting module 216 may receive the label of the storage device 250 from the label register module 214. The counting module 216 may start to count a unit time once it detects that the label is denoted as "Flag=1". During each unit time, the counting module 216 may recount the unit time when it receives another label that is also "Flag=1". When a complete unit time is run (i.e., no recounting occurs during a unit time), the counting module 216 may change the label of the storage device 250 to "Flag=0".

The power supply detector 220 may be configured to detect parameter(s) of the power supply to the storage device 250. For example, the power supply detector 220 may detect a voltage of power supply to the storage device 250. As another example, the power supply detector 220 may determine electric quantity of a power source. Merely by way of example, the power supply detector 220 may output a low voltage signal when it detects that a change of the voltage of power supply is greater than a voltage threshold, for example, a drop of the voltage of the storage device 250 is greater than 80% of the voltage of power supply. In some embodiments, the power supply detector 220 may include a circuit including a plurality of discrete components or an integrated circuit.

The RTC 230 may be configured to determine time information associated with the power outage protection system 100. For example, the RTC 230 may determine a period from a boot time of the storage device 250 to a current time. The RTC 230 may include any device that can determine time information, e.g., an RTC chip.

The processing engine 240 may be configured to process the information and/or data obtained from the label register module 214, the power supply detector 220, and/or the RTC 230. For example, the processing engine 240 may determine the state of the storage device 250 based on the label of the storage device 250 obtained from the label register module 214. Specifically, the processing engine 240 may determine that the storage device 250 is in the read/write state in response to the label of "Flag=1", and determine that the storage device 250 is in the idle state in response to the label of "Flag=0". In some embodiments, the processing engine 240 may determine a count of read/write of the storage device 250 by counting the times of the label of the storage device 250 changing from "Flag=0" to "Flag=1". As yet another example, the processing engine 240 may determine a read/write frequency of the storage device 250 based on the count of read/write and a period (e.g., the period from the boot time of the storage device 250 to the current time). In some embodiments, when an interruption of the power supply occurs, the processing engine 240 may perform a power outage protection operation based on a preset setting or a user setting. In some embodiments, the processing engine 240 may determine one or more storage devices which may need to be provided with electric power based at least on one of the states of the storage devices, the read/write frequencies of the storage devices, and the electric quantity of the power source (e.g., the power source 140). In some embodiments, based on the type of a power source (e.g., the power source 140) of the power outage protection system 100, the processing engine 240 may perform a corresponding operation. For example, when the power source includes a battery or a capacitor which can only provide very limited electric power, the processing engine 240 may generate an instruction to stop read/write operations of a plurality of storage devices and other operations of the power outage protection system 100. As another example, when the power source includes an UPS which may contain a relatively large amount of electric power, the processing engine 240 may merely perform a power-off or hibernation operation on storage device(s) that is in the idle state (e.g., denoted as "Flag=0"). The processing engine 240 may perform the power-off operation on a storage device by sending a power off or hibernation operation instruction. In some alternative embodiments, the processing engine 240 may determine the read/write frequency of a storage device that is in the idle state. In response to a determination that the read/write frequency of the storage device is greater than a frequency threshold, the processing engine 240 may maintain the electric power for the storage device. In response to a determination that the read/write frequency of the storage device is not greater than a frequency threshold, the processing engine 240 may perform the power off operation on the storage device.

The storage device 250 may be configured to read and/or write information and/or data from the external device. The storage device 250 may be same as or similar to the storage device(s) of the storage assembly 150 as described in connection with FIG. 1.

It should be noted that the example in FIG. 2 and the description thereof is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

It is understood that the connections between components of the computing device 200 in FIG. 2 are illustrative. Any two components of the computing device 200 may be connected or not. The connection between two components of the computing device 200 may be a one-way connection or a two-way connection. The connection between two components of the computing device 200 may include a wired connection and/or a wireless connection. The wired connection may include a metal cable, an optical cable, a hybrid cable, a welding connection (e.g., a soldering connection), or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, the computing device 200 may include one or more additional components or one or more components described above may be omitted.

Figure 3:
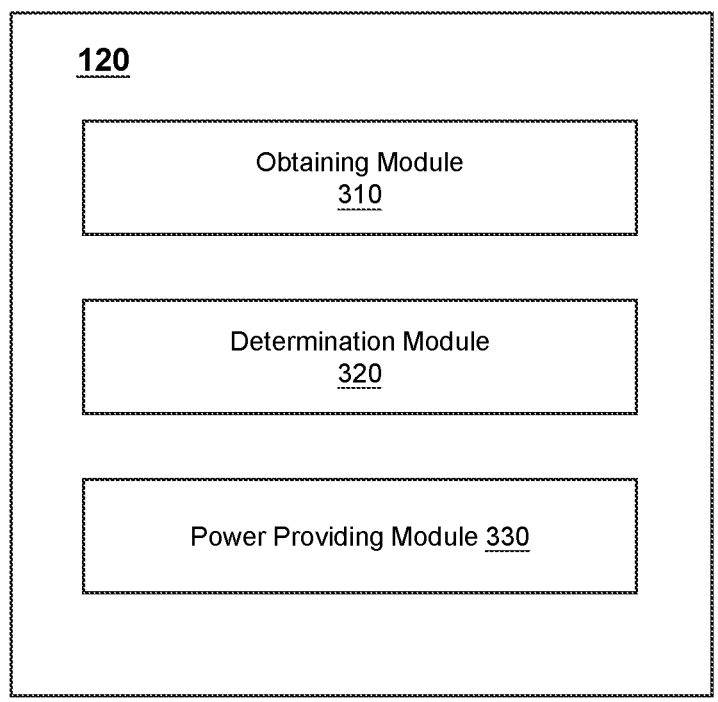
FIG. 3 is a block diagram illustrating an exemplary processing device according to some embodiments of the present disclosure.

FIG. 3 is a block diagram illustrating an exemplary processing device 120 according to some embodiments of the present disclosure. The processing device 120 may include an obtaining module 310, a determination module 320, and a power providing module 330.

The obtaining module 310 may be configured to obtain a read/write signal of each of a plurality of storage devices. The read/write signal of each of the plurality of storage devices may include a signal indicating data transmission between components of the storage device, and/or the storage device and an external device. In some embodiments, the obtaining module 310 may obtain the read the read/write signal of the storage device from a component (e.g., a controller, a memory, an interface, etc.) of the storage device.

The determination module 320 may be configured to identify a state of each of the plurality of storage devices based on the read/write signal of the storage device. The state of the storage device may include a read/write state or an idle state of the storage device. For example, the determination module 320 may determine an edge (e.g., a rising edge, a falling edge, etc.) of the read/write signal of the storage device and determine that the storage device is in the read/write state based on the edge of the read/write signal. In some embodiments, the determination module 320 may determine a read/write count of the storage device within a period. The determination module 320 may further determine a read/write frequency of the storage devices based on the read/write count of each of the storage device. In some embodiments, the determination module 320 may determine whether an interruption of power supply of the plurality of storage devices occurs. For example, the determination module 320 may determine one or more parameters (e.g., a voltage, a current, a power, a frequency, a power factor (PF), an electrical energy, etc.) associated with the power supply to determine the interruption of the power supply. The determination module 320 may further determine information of the power source, e.g., whether electric quantity of an electric power is greater than an electric quantity threshold.

The power providing module 330 may be configured to provide electric power to the storage device using the power source. In some embodiments, the power providing module 330 may select the storage device(s) which may be needed to be provided the electric power based on the state of each of the plurality of storage devices, the read/write frequency of each of the plurality of storage devices, information (e.g., the electric quantity) of the power source, or the like, or any combination thereof. In some embodiment, the power providing module 330 may perform a power-off or hibernation operation on the storage device. For example, the power providing module 330 may perform the power-off or hibernation operation on the storage device which is in the idle state.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure.

Figure 4:
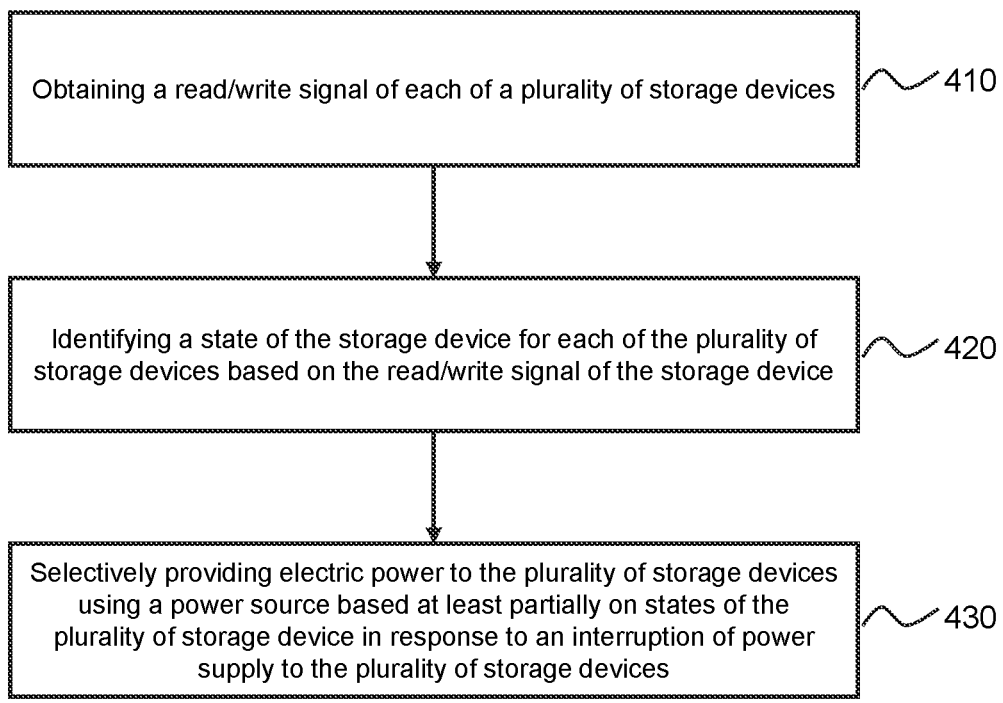
FIG. 4 is a flowchart illustrating an exemplary process for power outage protection of a plurality of storage devices according to some embodiments of the present disclosure.

FIG. 4 is a flowchart illustrating an exemplary process 400 for power outage protection of a plurality of storage devices according to some embodiments of the present disclosure. The process 400 may be executed by the power outage protection system 100. For example, the process 400 may be implemented as a set of instructions (e.g., an application) stored in the storage assembly 150 in the power outage protection system 100. The processing device 120 (or the computing device 200) may execute the set of instructions and may accordingly be directed to perform the process 400 in the power outage protection system 100. The operations of the illustrated process 400 presented below are intended to be illustrative. In some embodiments, the process 400 may be accomplished with one or more additional operations not described, and/or without one or more of the operations discussed. Additionally, the order in which the operations of the process 400 is performed as illustrated in FIG. 4 and described below is not intended to be limiting.

In 410, the processing device 120 (e.g., the obtaining module 310) (or the computing device 200) may obtain a read/write signal of each of a plurality of storage devices.

A read/write signal of a storage device may be a signal indicating data transmission between components of the storage device, the storage device and an external device (e.g., the terminal 130), etc. In some embodiments, the read/write signal may be indicated by a time varying voltage, current, electromagnetic wave, or the like, that carries information. Exemplary information carried by the read/write signal may include a write error rate, an unexpected power loss count, a start/stop count, a power-on hours, a loaded hour, a power-off retract count, or the like, or any combination thereof.

In some embodiments, the read/write signal of a storage device may indicate data transmission between the storage device and the external device via any transmission mode. Exemplary transmission mode of the read/write signal may include a serial transmission mode, a parallel transmission mode, etc. The serial transmission mode of the read/write signal refers to a communication technique that transmits the read/write signal one bit at a time in a sequential order over a computer bus or a communication channel. The parallel transmission mode refers to a communication technique that transmits the read/write signal multiple binary bits simultaneously.

In some embodiments, the processing device 120 (or the computing device 200) may obtain the read/write signal of a storage device from a component of the storage device. For example, the processing device 120 may obtain the read/write signal of the storage device from a controller, a memory, an interface (e.g., a PIN of the storage device), or the like, of the storage device. In some embodiments, the processing device 120 may obtain the read/write signal of the plurality of storage devices in real time or intermittently (e.g., periodically or irregularly).

In 420, for each of the plurality of storage devices, the processing device 120 (e.g., the determination module 320) (or the computing device 200) may identify a state of the storage device based on the read/write signal of the storage device.

In some embodiments, the state of the storage device may indicate whether the storage device is transmitting data with the external device. The state of the storage device may include a read/write state and an idle state. The read/write state may indicate that the storage device is transmitting data with the external device, and the idle state may indicate that the storage device is not transmitting data with the external device at a time point or during a period.

In some embodiments, the processing device 120 may directly or indirectly identify the state of the storage device based on the read/write signal of the storage device. Merely by way of example, the read/write signal may include an edge, a high stage, a low stage, etc. An edge of the read/write signal refers to a transition of the signal from a high stage to a low stage, or vice versa. The edge of the read/write signal may include a rising edge, a falling edge, etc. The rising edge of the read/write signal may refer to a transition of the signal from the low stage to the high stage. The falling edge of the read/write signal may refer to a transition of the signal from the high stage to the low stage. In some embodiments, an occurrence of the edge of the read/write signal may indicate that the storage device may be in the read/write state. In some embodiments, that the read/write signal is constantly at the high stage or the low stage (i.e., no stage transition occurs) may indicate that the storage device may be in the idle state. In some embodiments, the processing device 120 may identify the state of the read/write signal in various manners. For example, the processing device 120 may use a signal detection circuit to detect the edge of the read/write signal. As another example, the processing device 120 may use an edge detection instruction to detect the edge of the read/write signal of the storage device. In some embodiments, the processing device 120 may perform a pre-processing operation on the read/write signal before identifying the state of the storage device. The pre-processing operation of the read/write signal may include a denoising operation, an enhancement operation, a smoothing operation, a fusion operation, a segmentation operation, a registration operation, a transformation operation, a deserialization operation, or the like, or a combination thereof.

In 430, the processing device 120 (e.g., the power providing module 330) (or the computing device 200) may selectively provide electric power to the plurality of storage devices using a power source based at least partially on states of the plurality of storage device in response to an interruption of power supply to the plurality of storage devices.

In some embodiments, the processing device 120 (e.g., the determination module 320) may determine whether the interruption of the power supply of the plurality of storage devices occurs. In some embodiments, the processing device 120 may detect one or more parameters associated with the power supply to determine the interruption of the power supply. The parameter(s) associated with the power supply may include a voltage, a current, a power, a frequency, a power factor (PF), an electrical energy, or the like, or any combination thereof. Based on the parameter(s) associated with the power supply, the processing device 120 may determine whether the interruption of the power supply of the plurality of storage devices occurs. For example, the processing device 120 may detect a change of the voltage of the plurality of storage devices, and determine whether the change of the voltage of the plurality of storage devices is greater than a voltage threshold. In response to a determination that the change of the voltage of the plurality of storage devices is greater than the voltage threshold, the processing device 120 may determine that the interruption of power supply occurs. The voltage threshold may be determined by an operator of the plurality of storage devices or according to a default setting of the power outage protection system 100. As another example, the processing device 120 may monitor the voltage of the plurality of storage devices. In response to a determination that the monitored voltage is below a voltage threshold, the processing device 120 may determine that the interruption of pow supply occurs.

In response to a determination that the interruption of power supply occurs, the processing device 120 may select one or more storage devices from the plurality of storage devices, and instruct the power source to provide electric power for the selected storage device(s). In some embodiments, the processing device 120 may select the storage device(s) based on the state of each of the plurality of storage devices, a read/write frequency of each of the plurality of storage devices, information (e.g., the electric quantity) of the power source, or the like, or any combination thereof. More descriptions regarding the providing electric power to the storage device(s) may be found elsewhere in the present disclosure. See, e.g., FIGS. 5 to 11, and the relevant descriptions thereof.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 5:
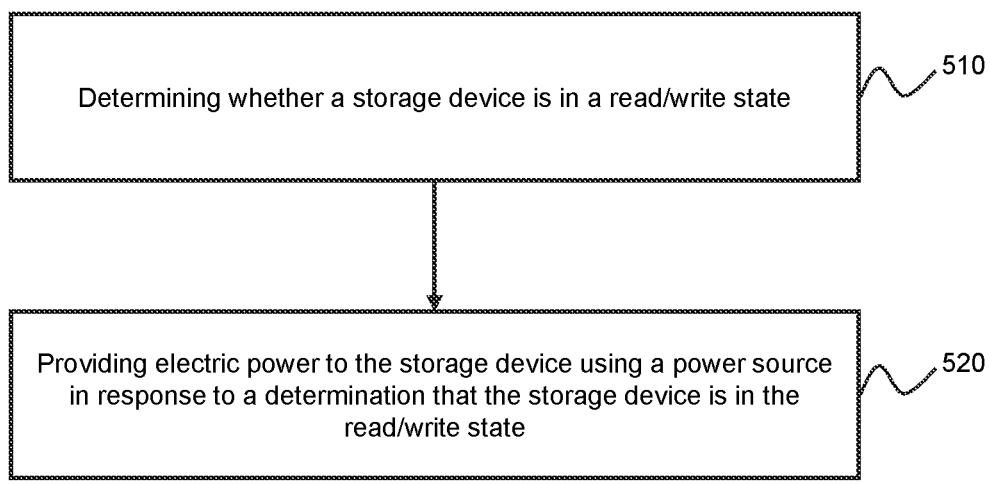
FIG. 5 is a flowchart illustrating an exemplary process for selectively providing electric power to a plurality of storage devices according to some embodiments of the present disclosure.

FIG. 5 is a flowchart illustrating an exemplary process 500 for selectively providing electric power to a plurality of storage devices according to some embodiments of the present disclosure. The process 500 may be an exemplary embodiment of operation 430 as described in connection with FIG. 4. The process 500 may be executed by the power outage protection system 100. For example, the process 500 may be implemented as a set of instructions (e.g., an application) stored in the storage assembly 150 in the power outage protection system 100. The processing device 120 (or the computing device 200) may execute the set of instructions and may accordingly be directed to perform the process 500 in the power outage protection system 100. The operations of the illustrated process 500 presented below are intended to be illustrative. In some embodiments, the process 500 may be accomplished with one or more additional operations not described, and/or without one or more of the operations discussed. Additionally, the order in which the operations of the process 500 is performed as illustrated in FIG. 5 and described below is not intended to be limiting.

In 510, the processing device 120 (e.g., the determination module 320) (or the computing device 200) may determine whether a storage device is in a read/write state.

In some embodiments, the processing device 120 may obtain a read/write signal of each of the plurality of storage devices. Based on the read/write signal of each of the plurality of storage devices, the processing device 120 may determine whether the storage device is in the read/write state. For example, the processing device 120 may determine that the storage device is in the read/write state on occurrence of a rising edge or a falling edge of the read/write signal. More descriptions regarding the identifying the rising edge or the falling edge may be found elsewhere in the present disclosure. See, e.g., operation 420 as described in connection with FIG. 4 and the relevant descriptions thereof.

In some embodiments, the processing device 120 may determine the state of the storage device before or at a time point when an interruption of power supply to the plurality of storage device occurs. In some embodiments, the processing device 120 may determine the state of the storage device based on an occurrence of the rising edge or the falling edge within a period (e.g., 20$s$, 40$s$, 60$s$, etc.). Merely by way of example, the processing device 120 may determine a period before the time point when the interruption of power supply occurs. During the period, the processing device 120 may determine whether the rising edge or the falling edge of the read/write signal occurs. In response to a determination that the rising edge or the falling edge occurs, the processing device 120 may determine that the storage device is in the read/write state, or vice versa.

Alternatively, the processing device 120 may obtain a label of the storage device e.g., from the label register module 214, and determine whether the storage device is in the read/write state. For example, the processing device 120 may determine that the storage device is in the read/write state in response to that the label of the storage device obtained by the processing device 120 is "Flag=1". As another example, the processing device 120 may determine that the storage device is in the idle state in response to the label of the storage device obtained by the processing device 120 is "Flag=0".

In 520, the processing device 120 (e.g., the power providing module 330) (or the computing device 200) may provide electric power to the storage device using a power source in response to the determination that the storage device is in the read/write state.

In some embodiments, in response to the determination that the storage device is in the read/write state, the processing device 120 may generate an instruction to control the power source (e.g., the power source 140) to provide the electric power to the storage device in the read/write state. In some embodiments, in response to a determination that the storage device is not in the read/write state (also referred as an idle state), the processing device 120 may generate an instruction to control the power source to perform a power-off or hibernation operation on the storage device. The providing electric power to the storage device which is in the read/write state may avoid the data lost, ensure safety of the data of the storage device, and efficiently use the electric power of the power source.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 6:
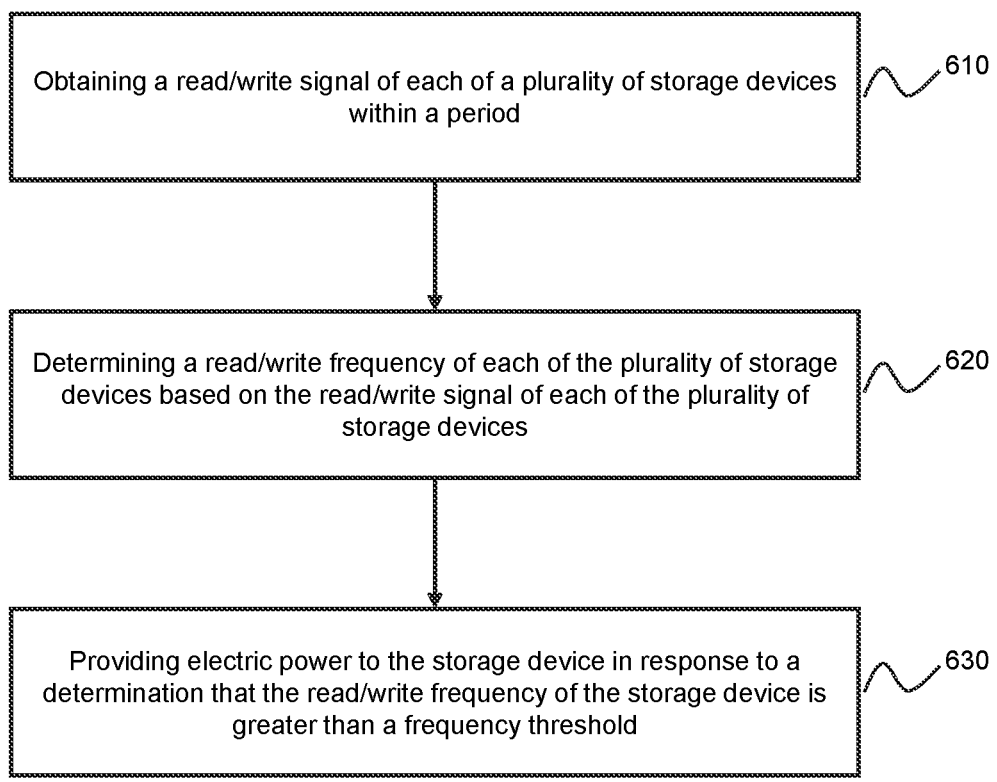
FIG. 6 is a flowchart illustrating an exemplary process for selectively providing electric power to a plurality of storage devices according to some embodiments of the present disclosure.

FIG. 6 is a flowchart illustrating an exemplary process 600 for selectively providing electric power to a plurality of storage devices according to some embodiments of the present disclosure. In some embodiments, the process 600 may be an exemplary embodiment of operation 430 as described in connection with FIG. 4. In some embodiments, the process 600 may be added after operation 520 as described in connection with FIG. 5 in response to a determination that the storage device is not in the read/write state. The process 600 may be executed by the power outage protection system 100. For example, the process 600 may be implemented as a set of instructions (e.g., an application) stored in the storage assembly 150 in the power outage protection system 100. The processing device 120 (or the computing device 200) may execute the set of instructions and may accordingly be directed to perform the process 600 in the power outage protection system 100. The operations of the illustrated process 600 presented below are intended to be illustrative. In some embodiments, the process 600 may be accomplished with one or more additional operations not described, and/or without one or more of the operations discussed. Additionally, the order in which the operations of the process 600 is performed as illustrated in FIG. 6 and described below is not intended to be limiting.

In 610, for each of a plurality of storage devices, the processing device 120 (e.g., the determination module 320) (or the computing device 200) may determine a read/write count of the storage device within a period.

In some embodiments, the plurality of storage devices herein may include all or a portion of storage devices of a storage assembly (e.g., the storage assembly 150). For example, the plurality of storage devices may only refer to the storage devices which are in an idle state (or labeled as "Flag=0"). In some embodiments, the period may be a preset period, or a period that can be dynamically adjusted by the processing device 120 according to different conditions. For example, the period may be from a boot time of the storage device to a current time. As another example, the period may be a period (e.g., 1 min) before the time point that an interruption of power supply of the plurality of storage device occurs. As yet another example, the period may be from a boot time of an external device (e.g., the terminal 130) which may perform data communication with the storage device to the current time. In some embodiments, the processing device 120 may determine the read/write count of the storage device based on a rea/write signal of the storage device. For example, the processing device 120 may determine a count of the rising edges or falling edges of the read/write signal of the storage device within the period. The processing device 120 may designate the count of the rising edges and/or the falling edges of the read/write signal of the storage device within the period as the read/write count of the storage device. Merely by way of example, the processing device 120 may detect the rising edges and/or the falling edges of the read/write signal of the storage device in real time, and update the read/write count when the processing device 120 detects another rising edge and/or a falling edge of the storage device. In some embodiments, the processing device 120 may determine the read/write count of the storage device based on a label of the storage device. For example, the processing device 120 may count the times of the label of the storage device changing from "Flag=0" to "Flag=1" within the period. The processing device 120 may designate the times of the label of the storage device as the read/write count of the storage device. Alternatively, the processing device 120 may directly obtain the read/write count of the storage device e.g., from the processing engine 240.

In 620, the processing device 120 (e.g., the determination module 320) (or the computing device 200) may determine a read/write frequency of each of the plurality of storage devices based on the read/write count of each of the plurality of storage devices.

A read/write frequency of a storage device refers to the read/write count of the storage device per unit time. In some embodiments, the processing device 120 may determine the read/write frequency of the storage device by diving the read/write count of the storage device by the period. More descriptions regarding the determining the read/write frequency of each of the plurality of storage devices may be found elsewhere in the present disclosure. See, e.g., FIG. 8 and the relevant descriptions thereof.

In 630, the processing device 120 (e.g., the power providing module 330) (or the computing device 200) may provide electric power to the storage device in response to a determination that the read/write frequency of the storage device is greater than a frequency threshold.

In some embodiments, the processing device 120 may determine whether the read/write frequency of each of the storage device is greater than the frequency threshold. The frequency threshold may be a preset value, or a value that can be dynamically adjusted by the processing device 120 according to different conditions. Alternatively, the processing device 120 may ranking the plurality of storage devices based on the read/write frequency of the plurality of storage devices. Based on a ranking result, the processing device 120 may select the storage device(s) (e.g., top 5 storage devices) to provide the electric power.

In some embodiments, the processing device 120 may generate an instruction to control a power source (e.g., the power source 140) to provide electric power to the selected storage devices. In some embodiments, in response to a determination that the read/write frequency of a storage device is not greater than the frequency threshold, the processing device 120 may generate an instruction to control the power source to perform a power-off or hibernation operation on the storage device, thereby ensuring the electric power used by the storage device(s) with high read/write frequency, and improving use time and service life of the power source.

Alternatively or additionally, the processing device 120 may determine whether to provide electric power to the storage devices based on information of the power source. Merely by way of example, the processing device 120 may determine whether the electric quantity of the power source is greater than an electric quantity threshold. In response to determining that the electric quantity of the power source is greater than the electric quantity threshold, the processing device 120 may provide electric power to the storage devices read/write frequency of which is greater than the frequency threshold. In response to determining that the electric quantity of the power source is not greater than the electric quantity threshold, the processing device 120 may not provide electric power to the storage devices, or provide electric power to a portion of the storage device (e.g., the storage device(s) which is in the read/write state, the top 3 storage devices in the ranking result, etc.).

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 7:
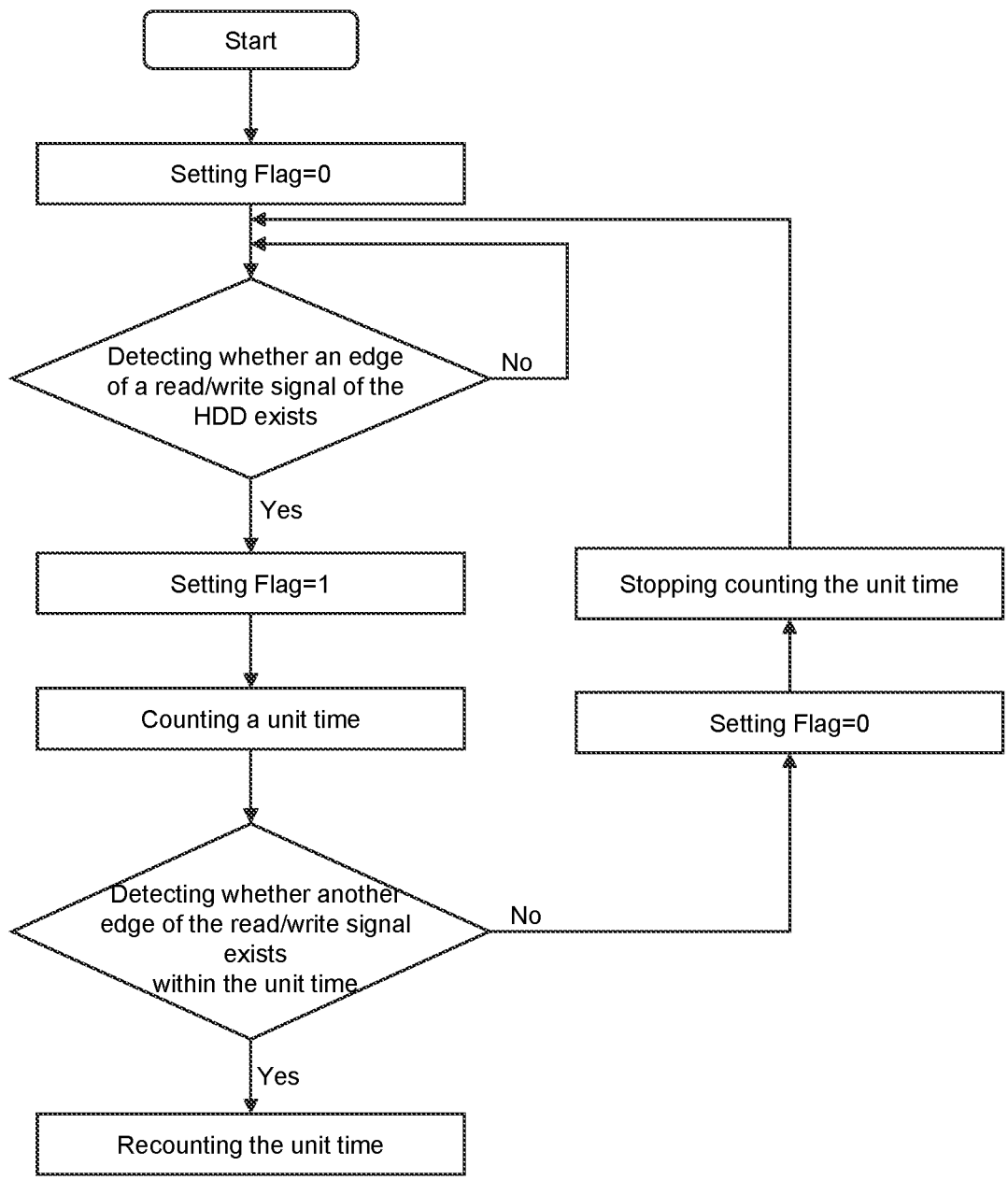
FIG. 7 is a flowchart illustrating an exemplary process for determining a state of a storage device according to some embodiments of the present disclosure.

FIG. 7 is a flowchart illustrating an exemplary process 700 for determining a state of a storage device according to some embodiments of the present disclosure. The process 700 may be an exemplary embodiment of operation 510 as described in connection with FIG. 5. The process 700 may be executed by the power outage protection system 100. For example, the process 700 may be implemented as a set of instructions (e.g., an application) stored in the storage assembly 150 in the power outage protection system 100. The processing device 120 (or the computing device 200) may execute the set of instructions and may accordingly be directed to perform the process 700 in the power outage protection system 100. The operations of the illustrated process 700 presented below are intended to be illustrative. In some embodiments, the process 700 may be accomplished with one or more additional operations not described, and/or without one or more of the operations discussed. Additionally, the order in which the operations of the process 700 is performed as illustrated in FIG. 7 and described below is not intended to be limiting.

In some embodiments, the storage device may include a mass storage (e.g., a magnetic disk, an optical disk, a solid-state drive, etc.), a removable storage (e.g., a flash drive, a floppy disk, an optical disk, a memory card, a zip disk, a magnetic tape, etc.), a volatile read-and-write memory (e.g., an RAM), a read-only memory (ROM), or the like, or any combination thereof. For illustration purposes, the following descriptions are described with reference to a hard disk drive (HDD), and not intended to limit the scope of the present disclosure.

In some embodiments, a power supply detector (e.g., the power supply detector 220), an interface multiplier of the HHD, and the HDD itself may output a read/write signal to indicate a read/write state of the HDD. When the HDD is in a read/write state, the read/write signal may include a periodic signal with a certain frequency. The processing device 120 may detect an edge of the periodic signal including a rising edge and/or a falling edge. When the rising edge (or the falling edge) is detected, the processing device 120 may determine the label of the storage device as "Flag=1", and start to count a unit time. If another edge of the read/write signal is detected within the unit time, the processing device 120 may recount the unit time. Otherwise, the processing device 120 may determine the label of the storage device as "Flag=0", and stop counting the unit time after the unit time is run out. When the edge of the read/write signal is detected, the processing device 120 may reperform the process 700. In this manner mentioned above, the processing device 120 may determine the state of the HHD at a time point when an interruption of a power source of the HDD occurs.

Figure 8:
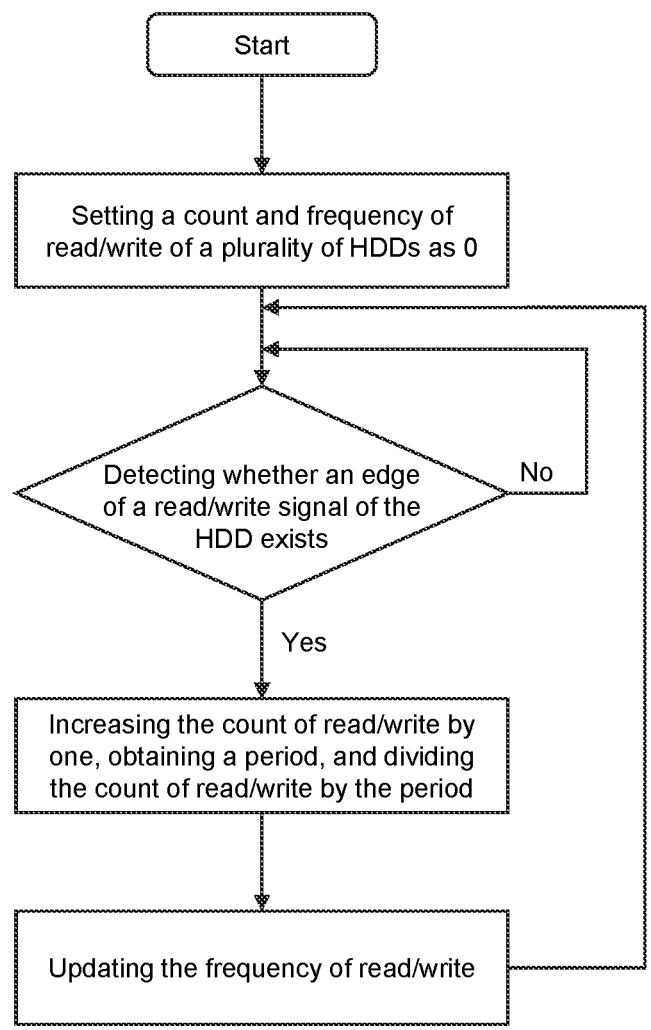
FIG. 8 is a flowchart illustrating an exemplary process for determining a read/write frequency of a storage device according to some embodiments of the present disclosure.

FIG. 8 is a flowchart illustrating an exemplary process 800 for determining a read/write frequency of a storage device according to some embodiments of the present disclosure. The process 800 may be an exemplary embodiment of operation 620 as described in connection with FIG. 6. The process 800 may be executed by the power outage protection system 100. For example, the process 800 may be implemented as a set of instructions (e.g., an application) stored in the storage assembly 150 in the power outage protection system 100. The processing device 120 (or the computing device 200) may execute the set of instructions and may accordingly be directed to perform the process 800 in the power outage protection system 100. The operations of the illustrated process 800 presented below are intended to be illustrative. In some embodiments, the process 800 may be accomplished with one or more additional operations not described, and/or without one or more of the operations discussed. Additionally, the order in which the operations of the process 800 is performed as illustrated in FIG. 8 and described below is not intended to be limiting. For illustration purposes, the following descriptions are described with reference to a hard disk drive (HDD), and not intended to limit the scope of the present disclosure.

The processing device 120 (e.g., the determination module 320 or the processing engine 240) may detect an edge (e.g., a rising edge, a falling edge, etc.) of a read/write signal of the HHD. Every time the rising edge (or the falling edge) of the read/write signal is detected, the processing device 120 may increase the read/write count of the HHD by one to generate an updated read/write count. The processing device 120 may determine a period from a boot time of the storage device to a current time. The processing device 120 may update the read/write frequency of the storage device by dividing the updated count of read/write by the period.

Figure 9:
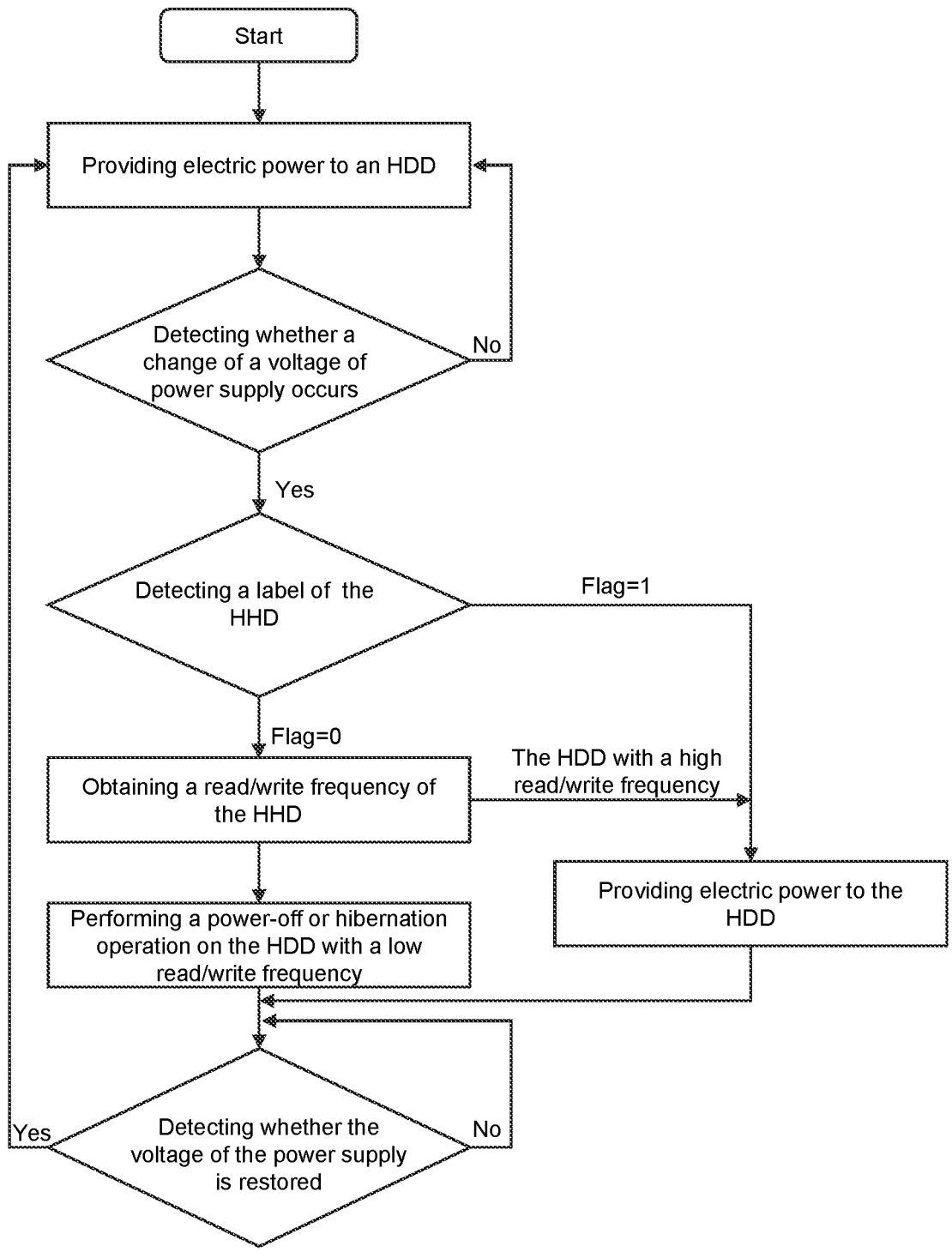
FIG. 9 is a flowchart illustrating an exemplary process for selectively providing electric power to a plurality of storage devices according to some embodiments of the present disclosure.

FIG. 9 is a flowchart illustrating an exemplary process 900 for selectively providing electric power to a plurality of storage devices according to some embodiments of the present disclosure. The process 900 may be an exemplary embodiment of operation 430 as described in connection with FIG. 4. The process 900 may be executed by the power outage protection system 100. For example, the process 900 may be implemented as a set of instructions (e.g., an application) stored in the storage assembly 150 in the power outage protection system 100. The processing device 120 (or the computing device 200) may execute the set of instructions and may accordingly be directed to perform the process 900 in the power outage protection system 100. The operations of the illustrated process 900 presented below are intended to be illustrative. In some embodiments, the process 900 may be accomplished with one or more additional operations not described, and/or without one or more of the operations discussed. Additionally, the order in which the operations of the process 900 is performed as illustrated in FIG. 9 and described below is not intended to be limiting. For illustration purposes, the following descriptions are described with reference to a hard disk drive (HDD), and not intended to limit the scope of the present disclosure.

In some embodiments, a power source (e.g., the power source 140) of a power outage protection system may include an UPS. In such case, the processing device 120 (e.g., the power providing module 330, the power supply detector 220) may determine whether a change of a voltage of the HDD is greater than a first HDD voltage threshold. In response to a determination that the change of the voltage of the HDD is greater than the first HDD voltage threshold, the processing device 120 may determine a state of the HDD. In response to a determination that the state of the HDD is not in the read/write state, the processing device 120 may determine a read/write frequency of the HDD. The processing device 120 may provide electric power to the HDD which may have a high read/write frequency that is above a frequency threshold. The processing device 120 may perform a power-off or hibernation operation on the HDD which may have a low read/write frequency that is lower than the frequency threshold. The first HDD voltage threshold and the frequency threshold may be predetermined based on a threshold setting or predetermined by a user of the power outage protection system 100.

When power supply is restored, the processing device 120 may power on or wake up the HDD again, thereby reducing electric power consumption of the power source, reducing difficulty for choosing the UPS, and increasing use time and life of the UPS.

Figure 10:
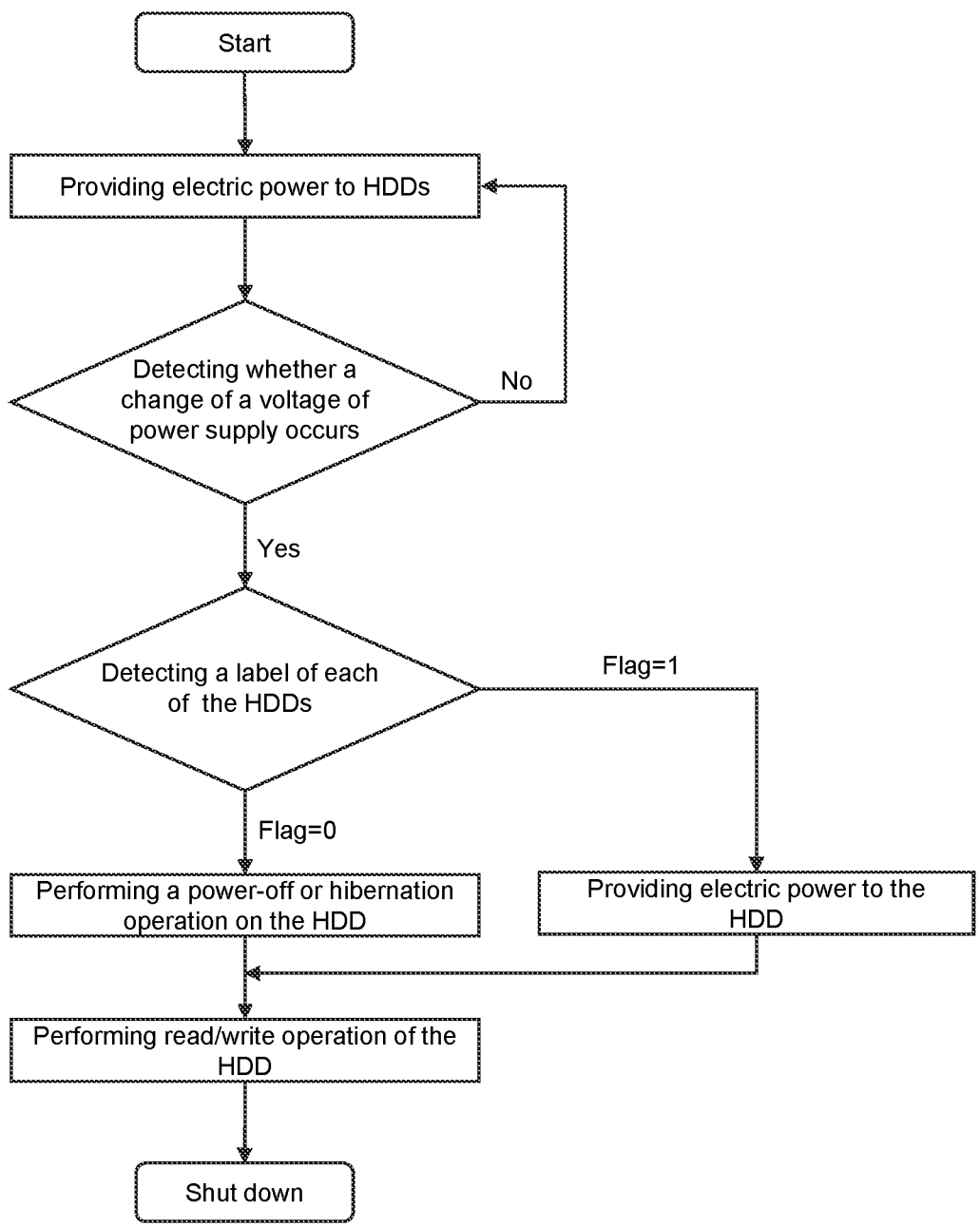
FIG. 10 is a flowchart illustrating an exemplary process for selectively providing electric power to a plurality of storage devices according to some embodiments of the present disclosure.

FIG. 10 is a flowchart illustrating an exemplary process 1000 for selectively providing electric power to a plurality of storage devices according to some embodiments of the present disclosure. The process 1000 may be an exemplary embodiment of process 500 as described in connection with FIG. 5. The process 1000 may be executed by the power outage protection system 100. For example, the process 1000 may be implemented as a set of instructions (e.g., an application) stored in the storage assembly 150 in the power outage protection system 100. The processing device 120 (or the computing device 200) may execute the set of instructions and may accordingly be directed to perform the process 1000 in the power outage protection system 100. The operations of the illustrated process 1000 presented below are intended to be illustrative. In some embodiments, the process 1000 may be accomplished with one or more additional operations not described, and/or without one or more of the operations discussed. Additionally, the order in which the operations of the process 1000 is performed as illustrated in FIG. 10 and described below is not intended to be limiting. For illustration purposes, the following descriptions are described with reference to a hard disk drive (HDD), and not intended to limit the scope of the present disclosure.

In some embodiments, a power source (e.g., the power source 140) of a power outage protection system may include a battery or a capacitor. In such case, the processing device 120 (e.g., the power providing module 330, the power supply detector 220) may determine whether a change of a voltage of the HDD is greater than a second HDD voltage threshold. In response to a determination that the change of the voltage of the HDD is greater than the second HDD voltage threshold, the processing device 120 may determine a state of the HDD. In response to a determination that the state of the HDD is not in a read/write state, the processing device 120 may perform a power-off or hibernation operation on the HDD. In response to a determination that the state of the HDD is in the read/write state, the processing device 120 may perform a shutdown operation after the HDD finishes the read/write operation, thereby ensuring integrity of data read/written by the HDD.

Figure 11:
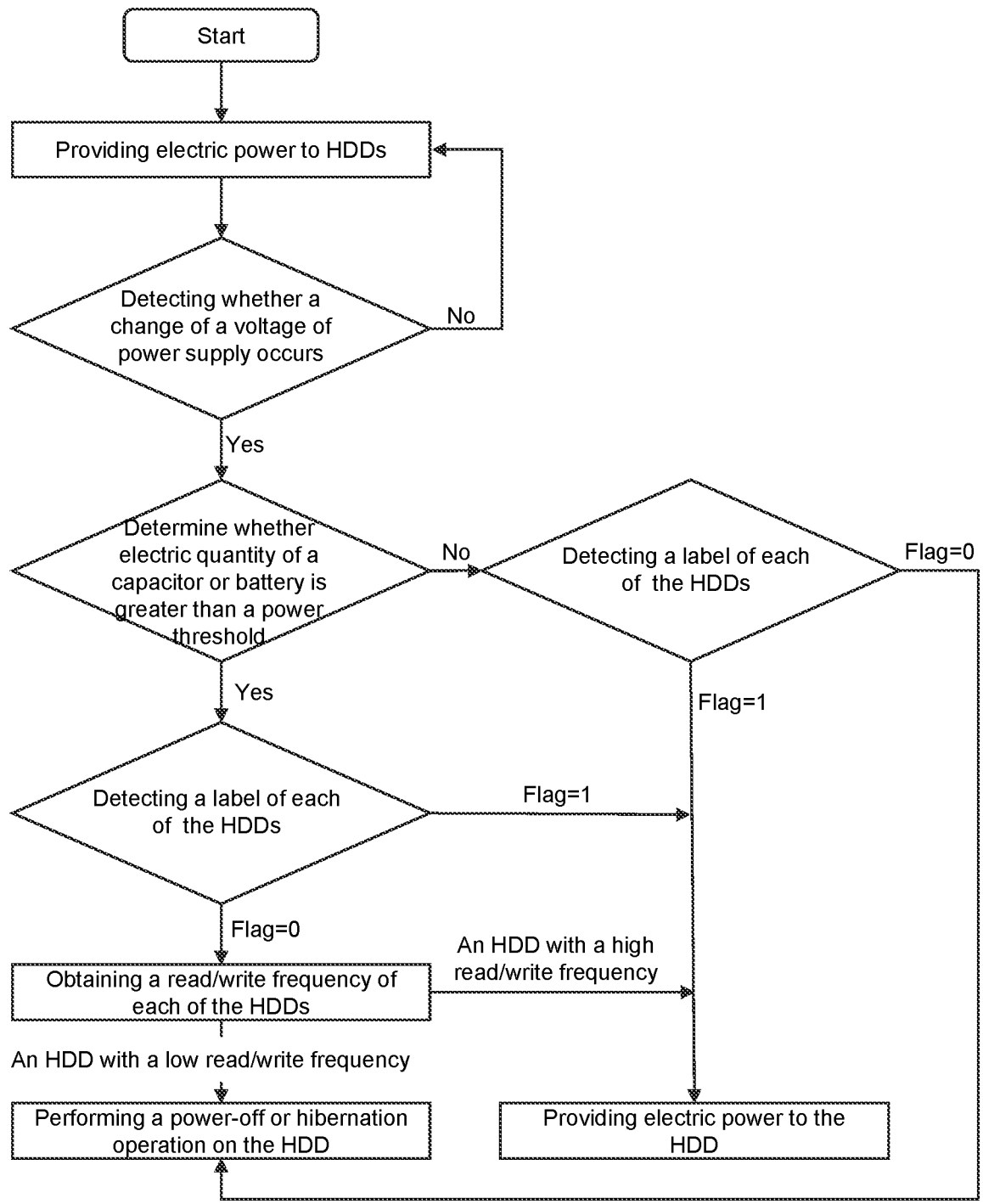
FIG. 11 is a flowchart illustrating an exemplary process for selectively providing electric power to a plurality of storage devices according to some embodiments of the present disclosure.

FIG. 11 is a flowchart illustrating an exemplary process 1100 for selectively providing electric power to a plurality of storage devices according to some embodiments of the present disclosure. The process 1100 may be an exemplary embodiment of process 400 as described in connection with FIG. 4. The process 1100 may be executed by the power outage protection system 100. For example, the process 1100 may be implemented as a set of instructions (e.g., an application) stored in the storage assembly 150 in the power outage protection system 100. The processing device 120 (or the computing device 200) may execute the set of instructions and may accordingly be directed to perform the process 1100 in the power outage protection system 100. The operations of the illustrated process 1100 presented below are intended to be illustrative. In some embodiments, the process 1100 may be accomplished with one or more additional operations not described, and/or without one or more of the operations discussed. Additionally, the order in which the operations of the process 1100 is performed as illustrated in FIG. 11 and described below is not intended to be limiting. For illustration purposes, the following descriptions are described with reference to a hard disk drive (HDD), and not intended to limit the scope of the present disclosure.

In a power outage protection system with a battery or a capacitor as the power source, the processing device 120 (e.g., the power providing module 330, the power supply detector 220) may determine whether a change of a voltage of the HDD is greater than a third HDD voltage threshold. In response to a determination that the change of the voltage of the HDD is greater than the third HDD voltage threshold, the processing device 120 may determine whether electric quantity of the capacitor or the battery is greater than a power threshold. In response to a determination that the electric quantity of the capacitor or the battery is greater than the power threshold, the processing device 120 may determine a state of the HDD. If the HDD is not in a read/write state, the processing device 120 may determine a read/write frequency of the HDD. The processing device 120 may provide electric power to the HDD which may have a high read/write frequency that is above a frequency threshold. The processing device 120 may perform a power-off or hibernation operation on the HDD which may have a low read/write frequency that is less than the frequency threshold. The third HDD voltage threshold and the frequency threshold may be predetermined based on a threshold setting or predetermined by a user of the power outage protection system 100.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

What is claimed is:

1. A system for power outage protection, comprising:
at least one processor configured to direct the system to perform operations including:
obtaining a read/write signal of each of a plurality of storage devices;
identifying, for each of the plurality of storage devices, a state of the storage device based on the read/write signal of the storage device, the state of the storage device including a read/write state or an idle state of the storage device; and
in response to an interruption of power supply to the plurality of storage devices,
for each of the plurality of storage devices, determining a read/write count of the storage device within a period based on the state of the storage device; and
selectively providing, based on the read/write count of each of the plurality of storage devices, electric power to the plurality of storage devices using a power source.

2. The system of claim 1, wherein each of the plurality of storage devices includes at least one of a controller, an interface, or a memory.

3. The system of claim 2, wherein the read/write signal of each of the plurality of storage devices includes at least one of a read/write signal from the controller, the interface, or the memory of the storage device.

4. The system of claim 1, wherein the identifying the state of each of the plurality of storage devices based on the read/write signal of the storage device includes:
   determining that the storage device is in the read/write state on occurrence of a rising edge or a falling edge of the read/write signal.

5. The system of claim 1, wherein to detect the interruption of power supply to the plurality of storage devices, the at least one processor is configured to direct the system to perform operations including:
   detecting a change of a voltage of the plurality of storage devices; and
   determining, in response to a determination that the change of the voltage of the plurality of storage devices is greater than a voltage threshold, that the interruption of power supply occurs.

6. The system of claim 1, wherein the selectively providing, based on the read/write count of each of the plurality of storage devices, electric power to the plurality of storage devices using a power source includes:
   determining, based on the read/write count of each of the plurality of storage devices, a read/write frequency of each of the plurality of storage devices; and
   providing, in response to a determination that the read/write frequency of one storage device is greater than a frequency threshold, electric power to the storage device.

7. The system of claim 6, wherein the determining the read/write frequency of each of the plurality of storage devices based on the read/write count of each of the plurality of storage devices includes:
   determining, for each of the plurality of storage devices, based on the read/write signal of the storage device, a count of occurrence of a rising edge or a falling edge of the read/write signal of the storage device within the period; and
   determining, based on the count of the occurrence of the rising edge or the falling edge of the read/write signal and the period, the read/write frequency of the storage device.

8. The system of claim 6, further comprising:
   determining whether electric quantity of the electric power is greater than an electric quantity threshold;
   providing, in response to determining that the electric quantity of the electric power is greater than the electric quantity threshold, electric power to the storage device the read/write frequency of which is greater than the frequency threshold.

9. The system of claim 6, further comprising:
   performing, in response to determining that the read/write frequency of the storage device is not greater than the frequency threshold, a power-off or hibernation operation on the storage device.

10. The system of claim 1, wherein the power source includes at least one of a battery, a capacitor, or an uninterruptible power supply (UPS).

11. A method for power outage protection, implemented on a computing device having at least one processor, the method comprising:
   obtaining a read/write signal of each of a plurality of storage devices;
   identifying, for each of the plurality of storage devices, a state of the storage device based on the read/write signal of the storage device, the state of the storage device including a read/write state or an idle state of the storage device; and
   in response to an interruption of power supply to the plurality of storage devices,
      for each of the plurality of storage devices, determining a read/write count of the storage device within a period based on the state of the storage device; and
      selectively providing, based on the read/write count of each of the plurality of storage devices, electric power to the plurality of storage devices using a power source.

12. The method of claim 11, wherein each of the plurality of storage devices includes at least one of a controller, an interface, or a memory.

13. The method of claim 12, wherein the read/write signal of each of the plurality of storage devices includes at least one of a read/write signal from the controller, the interface, or the memory of the storage device.

14. The method of claim 11, wherein the identifying the state of each of the plurality of storage devices based on the read/write signal of the storage device includes:
   determining that the storage device is in the read/write state on occurrence of a rising edge or a falling edge of the read/write signal.

15. The method of claim 11, wherein to detect the interruption of power supply to the plurality of storage devices, the method further comprises:
   detecting a change of a voltage of the plurality of storage devices; and
   determining, in response to a determination that the change of the voltage of the plurality of storage devices is greater than a voltage threshold, that the interruption of power supply occurs.

16. The method of claim 11, wherein selectively providing, based on the read/write count of each of the plurality of storage devices, electric power to the plurality of storage devices using a power source includes:
   determining, based on the read/write count of each of the plurality of storage devices, a read/write frequency of each of the plurality of storage devices; and
   providing, in response to a determination that the read/write frequency of one storage device is greater than a frequency threshold, electric power to the storage device.

17. The method of claim 16, wherein the determining the read/write frequency of each of the plurality of storage devices based on the read/write count of each of the plurality of storage devices includes:
   determining, for each of the plurality of storage devices, based on the read/write signal of the storage device, a count of occurrence of a rising edge or a falling edge of the read/write signal of the storage device within the period; and
   determining, based on the count of the occurrence of the rising edge or the falling edge of the read/write signal and the period, the read/write frequency of the storage device.

18. The method of claim 16, further comprising:
   determining whether electric quantity of the electric power is greater than an electric quantity threshold;
   providing, in response to determining that the electric quantity of the electric power is greater than the electric quantity threshold, electric power to the storage device the read/write frequency of which is greater than the frequency threshold.

19. The method of claim 16, further comprising:
performing, in response to determining that the read/write frequency of the storage device is not greater than the frequency threshold, a power-off or hibernation operation on the storage device.

20. A non-transitory computer readable medium, comprising a set of instructions for power outage protection, wherein when executed by at least one processor, the set of instructions direct the at least one processor to effectuate a method, the method comprising:
- obtaining a read/write signal of each of a plurality of storage devices;
- identifying, for each of the plurality of storage devices, a state of the storage device based on the read/write signal of the storage device, the state of the storage device including a read/write state or an idle state of the storage device; and
- in response to an interruption of power supply to the plurality of storage devices,
  - for each of the plurality of storage devices, determining a read/write count of the storage device within a period based on the state of the storage device; and
  - selectively providing, based on the read/write count of each of the plurality of storage devices, electric power to the plurality of storage devices using a power source.

* * * * *